United States Patent [19]
Cullen et al.

[11] Patent Number: 5,956,941
[45] Date of Patent: *Sep. 28, 1999

[54] METHOD AND SYSTEM FOR ESTIMATING A MIDBED TEMPERATURE OF A CATALYTIC CONVERTER

[75] Inventors: Michael John Cullen, Northville; Robert Sarow Baskins, Chelsea; Ziad Zaghati, Dearborn Heights; Christopher K. Davey, Novi; David R. Nader, Farmington Hills, all of Mich.

[73] Assignee: Ford Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/731,421

[22] Filed: Oct. 15, 1996

[51] Int. Cl.⁶ ........................................................ F01N 3/20
[52] U.S. Cl. ................................. 60/274; 60/277; 73/118.1
[58] Field of Search ............................. 60/274, 276, 277; 73/118.1; 701/103

[56] References Cited

U.S. PATENT DOCUMENTS

| | | | |
|---|---|---|---|
| 5,303,168 | 4/1994 | Cullen et al. | 701/103 X |
| 5,414,994 | 5/1995 | Cullen et al. | 60/274 |
| 5,509,268 | 4/1996 | Kuroda et al. | 60/277 |
| 5,513,520 | 5/1996 | Kuroda | 73/117.3 |
| 5,606,855 | 3/1997 | Tomisawa | 60/274 |
| 5,722,236 | 3/1998 | Cullen et al. | 60/274 |
| 5,729,971 | 3/1998 | Matsuno et al. | 60/277 |

FOREIGN PATENT DOCUMENTS 4433631  3/1996  Germany .

OTHER PUBLICATIONS

Patent Abstracts of Japan, vol. 016, No. 474 (M–1319), abstract of JP–04–171231, Oct. 1992.
Patent Abstracts of Japan, vol. 096, No. 003, abstract of JP–07–293312, Mar. 1996.

Primary Examiner—Tony M. Argenbright
Attorney, Agent, or Firm—Allan J. Lippa

[57] ABSTRACT

A method and system for estimating the midbed temperature of a catalytic converter in an exhaust system of an internal combustion engine. A rate of change in the speed of the engine is sensed and an estimated number of misfires occurring in the engine over a predetermined number of cylinder filling events is determined based on the sensed rate of change in engine speed. An instantaneous temperature of exhaust gas at the exhaust flange is determined based on the estimated rate of misfires. An instantaneous temperature at the midbed point of the catalytic converter is then determined based on the instantaneous temperature of exhaust gas at the exhaust flange. The instantaneous temperature at the midbed point is compared to a predetermined temperature threshold and the estimate rate of misfires is compared to a predetermined misfire rate threshold. A malfunction signal is then generated if both the instantaneous temperature at the midbed point exceeds the predetermined temperature threshold and the estimated rate of misfires exceeds the predetermined misfire rate threshold. A method for monitoring catalyst degradation is also disclosed.

25 Claims, 4 Drawing Sheets

Fig. 4

METHOD AND SYSTEM FOR ESTIMATING A MIDBED TEMPERATURE OF A CATALYTIC CONVERTER

TECHNICAL FIELD

This invention relates to methods and systems for estimating a midbed temperature of a catalytic converter based on the estimated rate of engine misfires.

BACKGROUND ART

An exhaust emission control apparatus typically includes a catalytic converter provided in an exhaust passage of an internal combustion engine to reduce the exhaust gas emissions produced by the engine. Such converters operate to chemically alter the exhaust gas composition produced by the engine to help meet various environmental regulations governing tailpipe emissions. Current methods of estimating the midbed temperature of a catalytic converter, however, fail to consider the effects of engine misfires which cause an increase in the temperature of the catalytic converter.

The use of an estimated temperature of the midbed point of a catalytic converter based on the rate of engine misfires is necessary for enhanced California Air Resources Board (CARB) On-Board Diagnostic (OBD-II) regulated systems. Under OBD-II automotive manufacturers must illuminate the malfunction indicator light (MIL) when the rate of misfires exceeds a rate which will cause catalyst damage due to excess temperature. Engines have misfires for many reasons soon after a cold start resulting in a high rate of illumination of the MILs. However, the catalyst has not been damaged because the engine has just been started. Thus, a large and unnecessary warranty cost is incurred.

Accordingly, there exists a need to accurately estimate the temperature of the midbed point of a catalytic converter taking into consideration the effect of engine misfires for use in determining when a rate of misfires exceeds a threshold which may cause catalyst degradation due to excess temperature.

Disclosure of the Invention

It is thus a general object of the present invention to provide a method and system for estimating the midbed temperature of a catalytic converter based on the rate of engine misfires.

In accordance with the present invention, the above object and other objects, features, and advantages of the present invention is achieved by sensing a rate of change of the speed of the engine and generating a corresponding speed signal. The method also includes the step of estimating a rate of misfires occurring in the engine over a predetermined number of cylinder filling events based on the speed signal. The method further includes the step of determining an instantaneous temperature of exhaust gas at a first point on the exhaust pipe based on the estimated rate of misfires. Still further, the method includes the step of determining an instantaneous temperature at the midbed point based on the instantaneous temperature of exhaust gas at the first point on the exhaust pipe.

In further carrying out the above object and other objects, features, and advantages of the present invention, a system is also provided for carrying out the steps of the above described method. The system includes a sensor for sensing the rate of change of the speed of the engine and a processor for performing the method steps described above.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
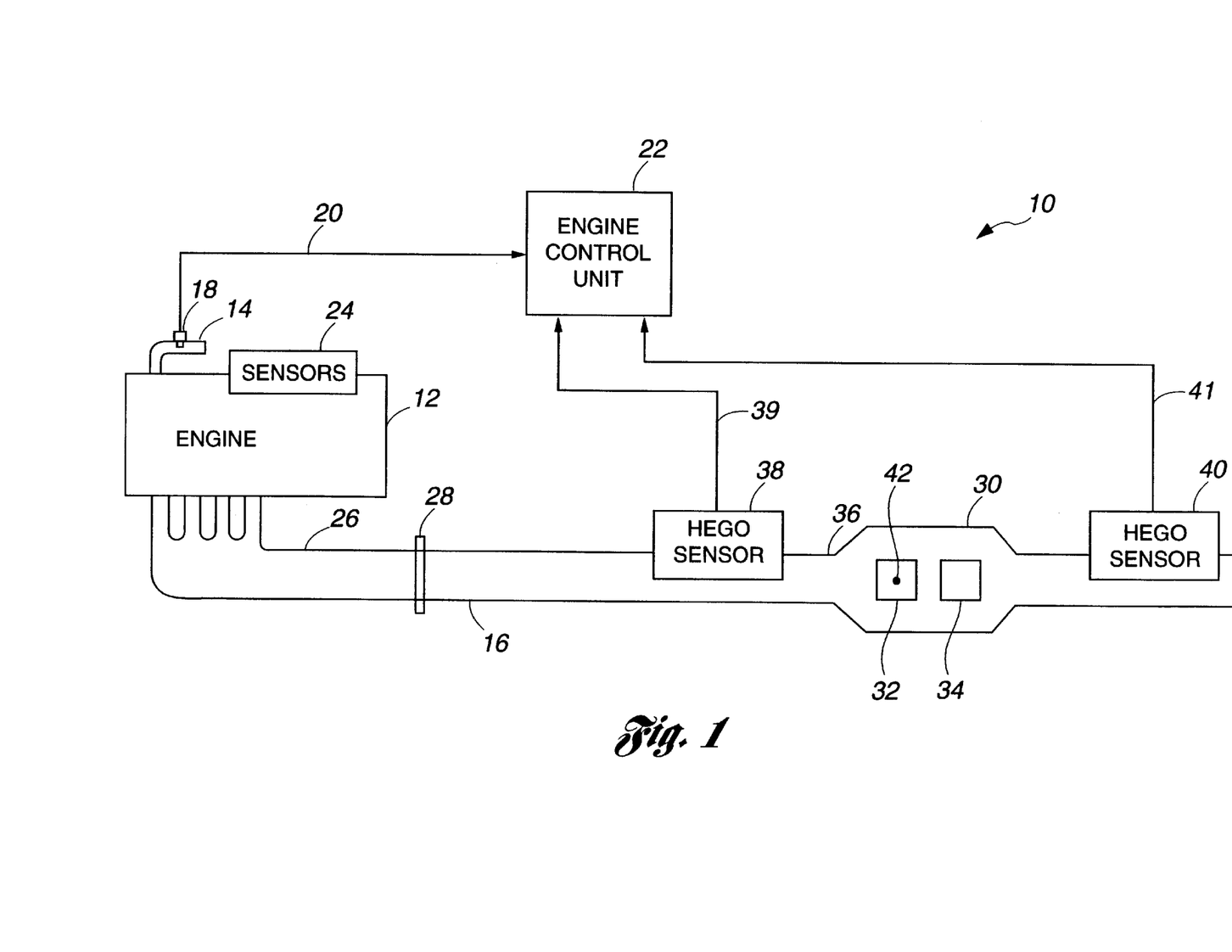
FIG. 1 is a schematic diagram of a vehicle engine and an electronic engine controller which embody the principles of the invention.

Turning now to FIG. 1, there is shown a schematic diagram of the system of the present invention, denoted generally by reference numeral 10. The system 10 includes an internal combustion engine 12 having an intake manifold 14 and an exhaust system 16. Positioned in the intake manifold 14 is a conventional mass air flow sensor 18 for detecting the amount of air inducted into the engine 12 and generating a corresponding air flow signal 20 for receipt by an Engine Control Unit (ECU) 22. The air flow signal 20 is utilized by the ECU 22 to calculate a value termed air mass (AM) which is indicative of a mass of air flowing into the induction system in lbs/min. The air flow signal 20 is also used to calculate a value termed air charge (AIRCHG) which is indicative of air mass per cylinder filling, in units of lbs. per cylinder filling where a cylinder filling occurs once for each cylinder of the engine upon every two engine revolutions for a four-stroke engine. In another embodiment utilizing a two-stroke engine a cylinder filling occurs for each cylinder of the engine 12 upon every engine revolution.

The system 10 further includes other sensors, indicated generally at 24, for providing additional information about engine performance to the ECU 22, such as crankshaft position, angular velocity, throttle position, air temperature, engine coolant temperature, etc. The information from these sensors is used by the ECU 22 to control operation of the engine 12.

The exhaust system 16, comprising an exhaust manifold 26 and an exhaust flange 28, transports exhaust gas produced from combustion of an air/fuel mixture in the engine 12 to a catalytic converter 30. The catalytic converter 30 contains a catalyst material 32 and 34 which receives the exhaust gas produced by the engine 12 via an inlet 36 and then chemically alters the exhaust gas to generate an inert catalyzed exhaust gas.

An upstream heated exhaust gas oxygen (HEGO) sensor 38, positioned upstream of the catalytic converter 30 on the exhaust system 16 of the engine 12, detects the oxygen content of the exhaust gas generated by the engine 12 and transmits a representative signal 39 to the ECU 22. A downstream HEGO sensor 40, positioned downstream of the catalytic converter 30, detects the oxygen content of the catalyzed exhaust gas and transmits a representative signal 41 to the ECU 22.

In a preferred embodiment, the catalyst material 32 and 34 of the catalytic converter 30 each experience degradation when operated at a temperature greater than approximately 1800 degrees fahrenheit. A temperature at a midbed point, shown at 42, of the catalyst material is representative of the temperature of the catalyst material in the catalytic converter 30. The midbed point 42 is preferably located one inch from the initial point of contact of exhaust gas on the first catalyst material 32, at the axial centerline of the first catalyst material 32.

In a preferred embodiment, during engine operation, the temperature of the midbed point 42 is determined. The midbed temperature can be used in many applications, such as monitoring the catalytic converter for damage under the CARB OBD-II regulations, limiting spark retard during traction control, providing an air/fuel ratio to meet a given exhaust temperature limit, etc.

Figure 2:
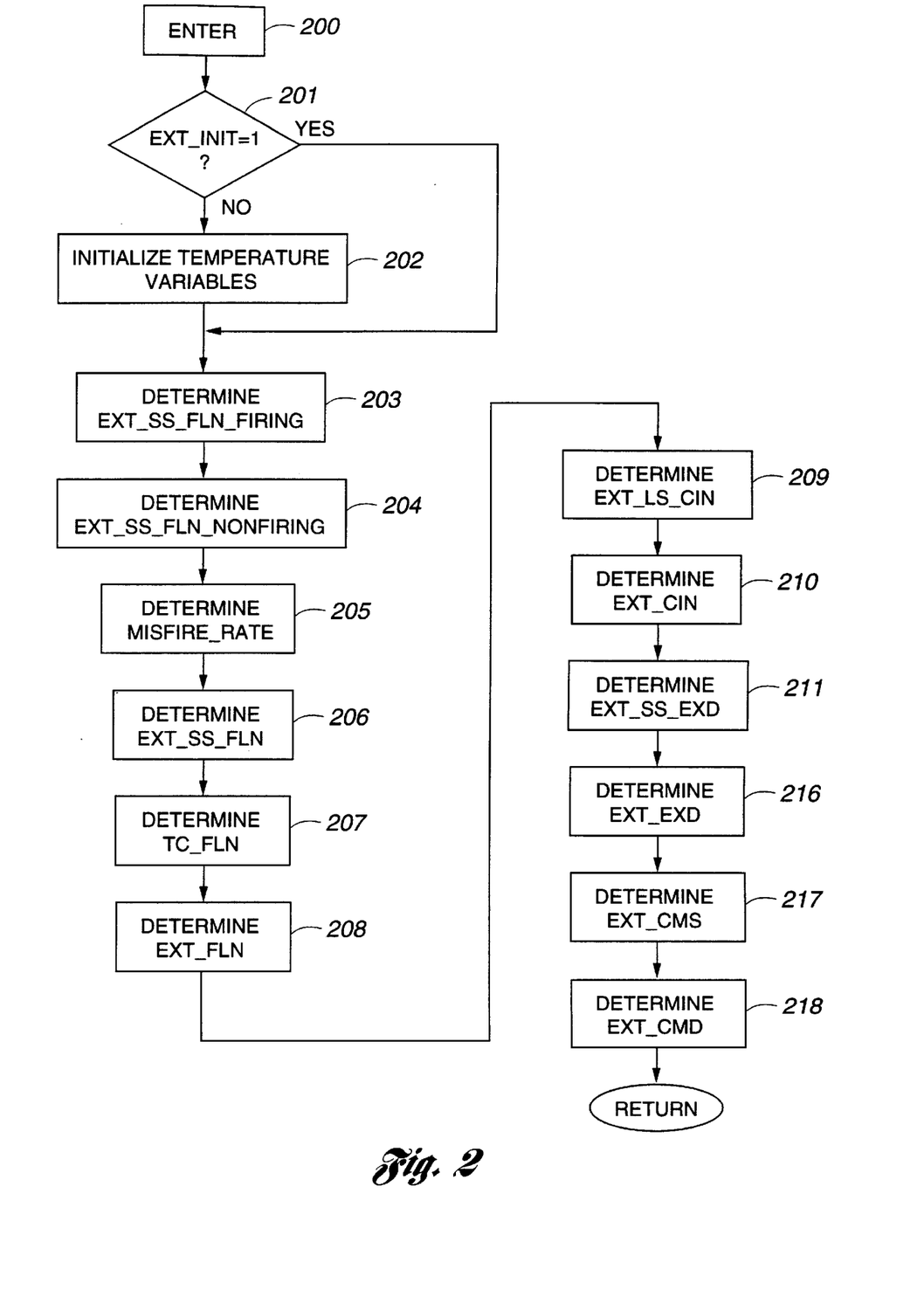
FIGS. 2, 3 and 4 are flowcharts illustrating the general sequence of steps associated with the operation of the present invention.
Figure 3:
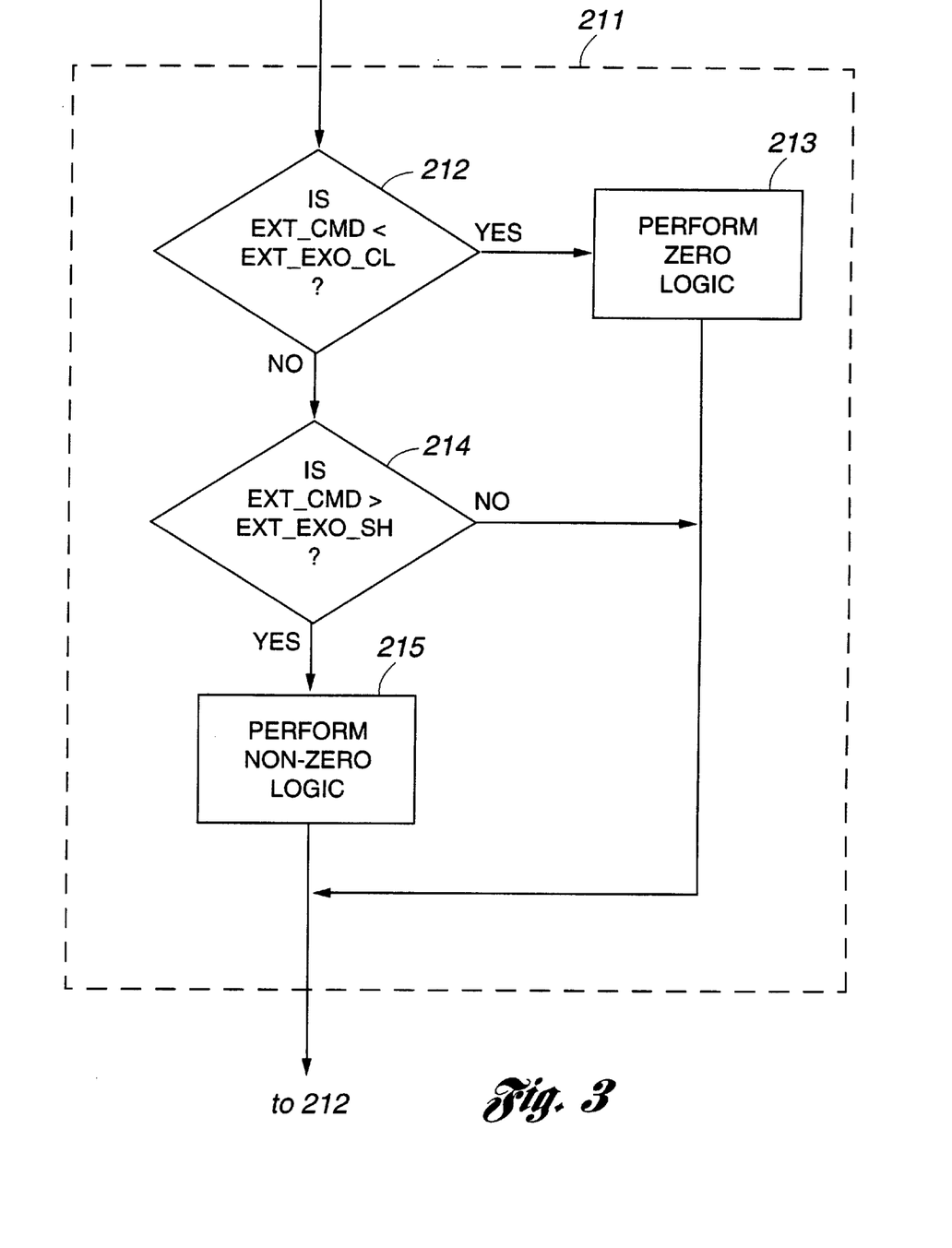
Figure 4:
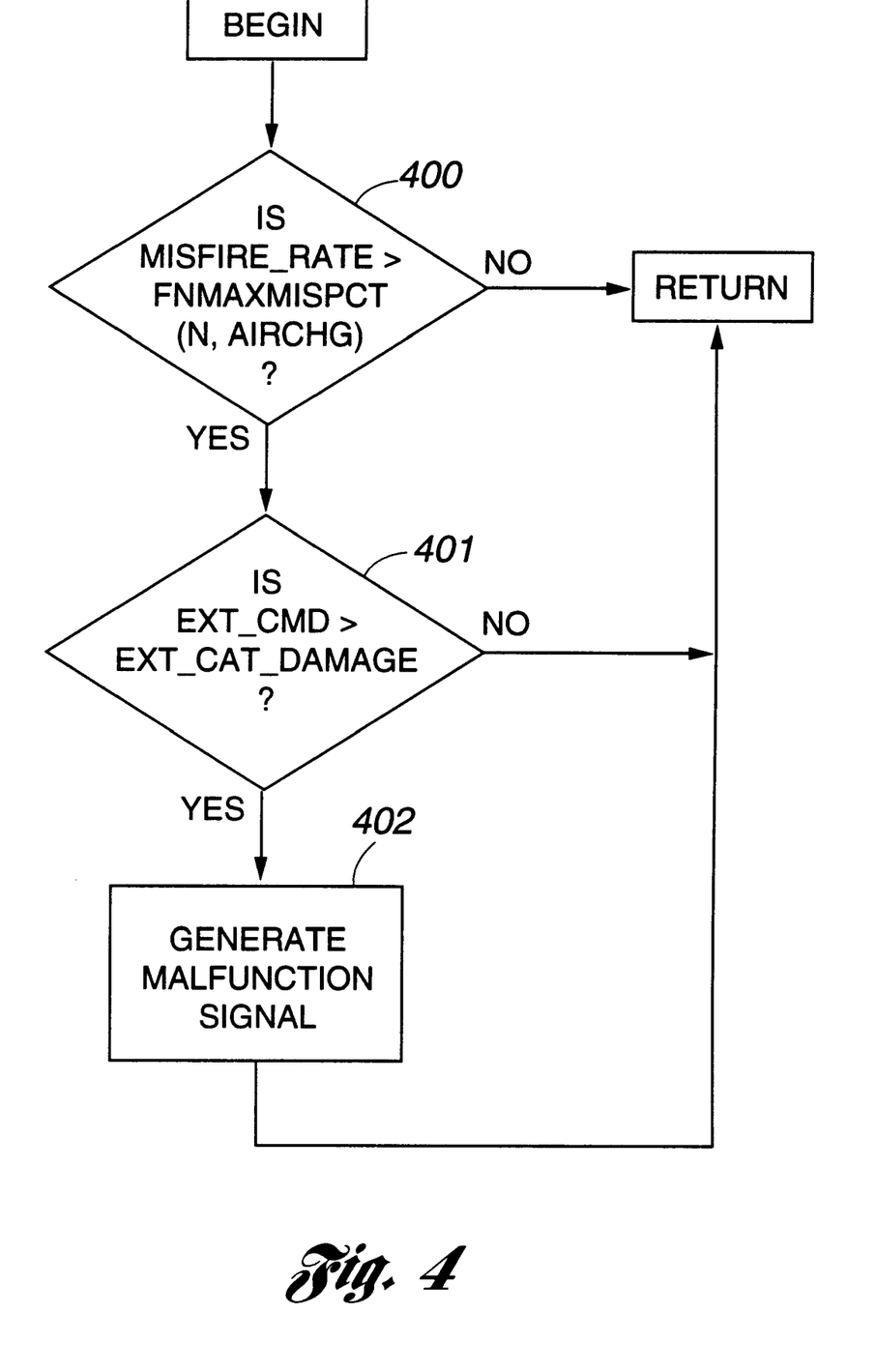

FIGS. 2, 3 and 4 are flowcharts showing the steps in a routine performed by the ECU 22. In a preferred embodiment, the steps shown in FIGS. 2, 3 and 4 comprise a portion of a larger routine which performs other engine control functions. FIGS. 2 and 3 shows the steps in a temperature determination routine performed by the ECU 22 to determine the temperature of the midbed point 42 of the catalytic converter 30 during engine operation.

The midbed temperature determination routine is entered at 200 and at 201 an initialization flag EXT_INIT is checked to determine if certain temperature variables have been initialized. A preferred embodiment advantageously initializes certain temperature variables in a manner to account for instances where an engine may be turned off for short periods of time in which the catalytic converter may not have cooled to an ambient temperature. Catalytic converter over-temperature conditions are accordingly reduced by estimating converter temperature upon engine ignition as a function of converter temperature upon engine shut off, ambient temperature, a calibratable time constant indicative of converter cooling and the time elapsed from engine shut off to subsequent engine operation. EXT_INIT will be set to a value of zero when engine power is turned on so that the temperature variables may be initialized at 202. Once the variables are initialized, EXT_INIT is set to a value of one and remains at such a value until engine operation is terminated. At 202 a plurality of variables to be used in the temperature determination routine are initialized as shown below:

$$EXT\_FL = (EXT\_FL - INFAMB\_KAM) * FNEXP \\ (-ENG\_OFF\_TMR/TC\_SOAK\_FL) + INFAMB\_KAM \quad (1)$$

$$EXT\_CMD = (EXT\_CMD - INFAMB\_KAM) * FNEXP \\ (-ENG\_OFF\_TMR/TC\_SOAK\_CMD) + INFAMB\_KAM \quad (2)$$

$$EXT\_SS\_FLN = EXT\_FL \quad (3)$$

$$EXT\_INIT = 1 \quad (4)$$

where:

EXT_FL is a value which is stored in the ECU 22 and which is indicative of an instantaneous temperature of exhaust gas at exhaust flange 28. As can be seen from equations (1) and (2) above, if the engine has been turned off for a long period of time, ENG_OFF_TMR will contain a large value, the exponential function will result in the first additive term on the right hand side of the equation equalling zero, and the temperature of the catalyst midbed and exhaust flange will equal the ambient temperature. For shorter periods of time the exponential function FNEXP will approximate the cooling off of the catalyst midbed. Because EXT_FL is stored in the ECU 22, upon initialization EXT_FL will advantageously contain the temperature of exhaust gas at exhaust flange 28 when the engine was last turned off, ENG_OFF_TMR is a variable which indicates the time, in seconds, that the engine has been turned off, TC_SOAK_FL is a calibratable time constant, in seconds, associated with the cooling off of exhaust gas at the exhaust flange 28 when the engine is turned off, FNEXP( ) is a look-up table stored in the ECU 22 which approximates an exponential function for use by a fixed point processor in the ECU 22, EXT_CMD is an instantaneous temperature value at midbed point 42 of the catalytic converter 30, ENG_OFF_TMR is as previously described, TC_SOAK_CMD is an empirically derived time constant, in seconds, of the cooling off of exhaust gas at the catalyst midbed, and INFAMB_KAM is a value indicative of an estimate of ambient air temperature in degrees fahrenheit, which may be estimated utilizing a temperature sensor.

At 203 a steady state temperature value indicative of a steady state temperature of the exhaust flange 28 when the engine 12 is firing is determined according to the method disclosed in U.S. Pat. No. 5,414,994, issued to Cullen et al., which is hereby incorporated by reference in its entirety. The steady state temperature of the exhaust flange 28 is determined according to the following relationship:

$$EXT\_SS\_FLN\_FIRING = FN4441(N, \\ AIRCHG) * FN441A(LAMBSE) * FN441B(SPK\_ \\ DELTA) * FN441C(EGRACT) + [FN441T(AM) * (ECT-200)] \quad (5)$$

where:

FN4441(N,AIRCHG) is an empirically derived value, contained in a table indexed by engine speed, N, and air charge, AIRCHG, which is indicative of a base steady-state exhaust flange temperature, in degrees fahrenheit at a particular engine speed and air charge at an air/fuel ratio (A/F) of 14.6 A/F, 0% exhaust gas recirculation (EGR), maximum spark for best torque, and 200 degrees fahrenheit engine coolant temperature (ECT), FN441A(LAMBSE) is a value contained in a table, and indexed by air/fuel modulation variable LAMBSE, which is indicative of the effect of LAMBSE on exhaust flange temperature, FN441B(SPK_DELTA) is a value, contained in a table indexed by a spark delta, in crank angle degrees which is indicative of an effect of spark timing on the exhaust flange temperature, FN441C(EGRACT) is a value, contained in a table indexed by level of exhaust gas recirculation, which is indicative of the effect of exhaust gas recirculation on the exhaust flange temperature, and FN441T(AM) is a value, indexed by air mass, AM, which is indicative of a reduction in exhaust flange temperature per degree of engine coolant temperature below 200 degrees fahrenheit.

At 204 a steady state temperature value indicative of a steady state temperature of the exhaust flange 28 due to non-firing of the engine 12 is determined according to the following relationship:

$$EXT\_SS\_FLN\_NONFIRING = (ACT + ECT)/2 \quad (6)$$

where:

ACT is a value indicative of a temperature of the airflow into the engine 12, and ECT is a value indicative of the engine coolant temperature.

At 205 a value indicative of the average rate of misfires per cylinder filling is determined. The speed of the engine is measured very precisely using the crankshaft position sensor (not shown). In the event of a misfire, the momentum, which is normally produced by the combustion, is lacking. Thus, abnormal variations of speed changes at steady state conditions may be considered as misfire. In the preferred embodiment, the estimated rate of misfires is determined according to the following relationship:

$$\text{MISFIRE\_RATE}=[FK*B*(A/B-\text{MISFIRE\_RATE(old)}]+\text{MISFIRE\_RATE(old)} \quad (7)$$

where:

A is a value indicative of the incremental number of misfires since the last update, B is a value indicative of the incremental number of cylinder fillings since the last update, MISFIRE_RATE(old) is a value indicative of the average misfire rate determined during the last update, and FK is a filter constant that is progressively weighted by the total number of cylinder events tested, with upper and lower clips BETAMISHI and BETAMISLO, respectively, and is determined according to the following relationship:

$$FK=1/(\text{\# of events since engine started}) \quad (8)$$

Equation 8 allows an instantaneous average at initial start-up to be determined, and switch over to a rolling average as time progresses. For instance, setting BETAMISHI=1.0 allows the misfire rate calculation to jump to the instantaneous average value on the first update. As the total number of events tested increases, the filter constant decreases inversely and continues to calculate a true average misfire rate. When the filter constant hits the lower clip BETAMISLO, the calculation becomes a rolling average in that the misfire rate covers a sliding window spanning the last 1/BETAMISLO events.

At 206 a steady state temperature value indicative of a steady state temperature of the exhaust flange 28 due to both firing and non-firing of the engine 12 is determined according to the following relationship:

$$EXT\_SS\_FLN=\text{MISFIRE\_RATE}*EXT\_SS\_FLN\_\text{NONFIRING}+(1-\text{MISFIRE\_RATE})*EXT\_SS\_FLN\_\text{FIRING} \quad (9)$$

At 207 a time constant TC_FLN, which is indicative of a temperature rise of the exhaust flange 28, is calculated as a function of AM into the system 10 according to the following relationship:

$$TC\_FLN=FNxx1(AM) \quad (10)$$

where, FNxx1 (AM) is a value obtained from a table, indexed by AM, as previously described, and is indicative of a time constant, in seconds, of the rise in exhaust flange temperature due to a step change in instantaneous predicted exhaust flange temperature versus air mass. This time constant is associated with the heat capacity of the metal from the combustion chamber to the exhaust flange 28.

At 208, an instantaneous value of the exhaust flange, EXT_FLN, is then calculated as a function of the steady state exhaust flange temperature, EXT_SS_FLN, the time constant of the temperature rise, TC_FLN, and the time required for execution of the background loop, BG_TMR, according to the following relationships:

$$EXT\_FLN=[(1-FK)*EXT\_FLN(\text{old})]+FK*EXT\_SS\_FLN \quad (11)$$

where, FK performs an exponential smoothing function according to the following relationship:

$$FK=1/[1+(TC\_FLN/BG\_TMR)] \quad (12)$$

A steady state temperature drop, EXT_LS_CIN, between the exhaust flange 28 and the exhaust gas inlet 36 of the catalytic converter 30 is calculated at step 209 according to the following relationship:

$$EXT\_LS\_CIN=FN445L(AM)*\text{DELTA}\_T \quad (13)$$

where,

FN445L(AM) is a unitless value, contained in a table indexed by mass flow rate of air AM, which is indicative of a temperature drop between exhaust flange 28 and catalyst inlet 36 as a function of AM, and DELTA_T is a value which is indicative of a temperature difference in degrees fahrenheit between ambient temperature and the average exhaust gas temperature in the exhaust pipe between the exhaust flange 28 and the exhaust gas inlet 36.

DELTA_T is preferably calculated according to the following relationship:

$$\text{DELTA}\_T=AVG\_T-INFAMB\_KAM \quad (14)$$

where,

INFAMB_KAM is as previously described, and

AVG_T is a value indicative of an average value of exhaust gas temperature from the exhaust flange 28 to the exhaust gas inlet 36 of the catalytic converter 30.

AVG_T is preferably calculated according to the following relationship:

$$AVG\_T=(EXT\_FL+EXT\_CIN)/2 \quad (15)$$

where,

EXT_FLN is as previously described, and

EXT_CIN is a value indicative of the temperature of the exhaust gas at the exhaust gas inlet 36 of the catalytic converter 30.

The value contained in EXT_CIN is calculated in a manner to be described below. As can be seen from FIG. 2, in a preferred embodiment, a value of EXT_CIN which was calculated upon the prior execution of the steps in FIG. 2 is used in equation (15) above.

The temperature value, EXT_CIN, is calculated at step 210 as a function of the instantaneous temperature of the exhaust flange 28, EXT_FL, and of the steady state temperature drop between the exhaust flange 28 and the exhaust gas inlet 36, EXT_LS_CIN, as shown below:

$$EXT\_CIN=EXT\_FLN-EXT\_LS\_CIN \quad (16)$$

At 211, a value EXT_SS_EXD, which is indicative of the increase in temperature of the exhaust gas in the catalytic converter 30 due to the exothermic reaction of the exhaust gas with the catalyst material 32 and 34 is calculated based on a determination of whether or not the catalytic converter 30 has lit off.

The determination of the temperature value of the steady state exotherm difference is further illustrated in FIG. 3. If the temperature of the midbed point 42 of the catalytic converter 30, EXT_CMD, is less than a clear low (CL) value, EXT_EXO_CL, a zero logic is performed, as shown at 212 and 213, respectively. The value contained in EXT_CMD is calculated in a manner to be described below. As can be seen from FIG. 2, in a preferred embodiment, a value of EXT_CMD, which was calculated upon the prior execution of the steps in FIG. 2, is used here. The temperature value of the steady state exotherm difference is then calculated according to the following relationship:

$$IF(EXT\_CMD<EXT\_EXO\_CL) \qquad (10)$$

THEN $$EXO\_AT\_STOIC=0 \qquad (17)$$

$$EXT\_SS\_CMS=EXT\_CIN \qquad (18)$$

$$EXT\_SS\_EXD=0 \qquad (19)$$

where,

EXT_CMD is as previously described,

EXT_EXO_CL is a calibratable clear low value, e.g., 400 degrees fahrenheit, indicative of the temperature below which the catalytic converter 30 is not lit off, EXO_AT_STOIC is a value indicative of the exotherm temperature at stoichiometric air/fuel, EXT_SS_CMS is a value indicative of the steady state temperature of the midbed point 36 of the catalytic converter 30 at stoichiometric air/fuel, EXT_CIN is as previously described, and EXT_SS_EXD is a value indicative of the temperature of the steady state exotherm difference.

If the temperature of the midbed point 42 of the catalytic converter 30, EXT_CMD, is greater than a set high (SH) value, EXT_EXO_SH, a non-zero logic is performed, as shown at 214 and 215, respectively, and calculated according to the following relationship:

$$IF(EXT\_CMD>EXT\_EXO\_SH)$$

THEN $$EXO\_AT\_STOIC=FN448A(1) \qquad (20)$$

$$EXT\_SS\_CMS=EXO\_AT\_STOIC+EXT\_CIN \qquad (21)$$

$$EXT\_SS\_EXO=FN448A(LAMBSE)+MISFIRE\_RATE*FNxx2(AM) \qquad (22)$$

$$EXT\_SS\_EXD=EXT\_SS\_EXO-EXO\_AT\_STOIC \qquad (23)$$

where,

EXT_EXO_SH is a calibratable set high value, e.g., 500 degrees fahrenheit, indicative of the temperature above which the catalytic converter 30 begins to light off, FN448A(1) is the value of the exotherm at an equivalence ratio of one which corresponds to stoichiometric air/fuel, EXT_SS_EXO is a value indicative of the increase in temperature of the exhaust gas in the catalytic converter 30 due to the exothermic reaction of the exhaust gas with the catalyst material 32 and 34, FN448A(LAMBSE) is a predetermined value, in degrees fahrenheit, indicative of a steady-state increase in exhaust temperature in the catalyst, and is stored as a function of LAMBSE, MISFIRE_RATE is as previously described, and FNxx2(AM) is the increase in exotherm per percent misfire as a function of air mass.

The determination of the temperature value of the steady state exotherm difference employs a hysteresis methodology. Once the catalyst is lit off, it remains lit off until the catalyst midbed temperature falls below the CL value.

Returning now to FIG. 2, at 216 an instantaneous temperature value for exotherm difference is determined by first calculating a time constant value, TC_EXD, indicative of a temperature rise of the exhaust gas in the catalytic converter 30 in seconds according to the following relationship:

$$TC\_EXD=FN449A(AM) \qquad (24)$$

where,

FN449A(AM) is a value obtained from a table, indexed by AM, and is indicative of a time constant, in seconds, of the change in catalyst midbed temperature due to a step change in the exotherm versus air mass (AM).

The instantaneous temperature value EXT_EXD is then determined at 216 as a function of the steady state exotherm difference value, EXT_SS_EXD, the time constant of the temperature rise of the exotherm difference, TC_EXD, and BG_TMR according to the following relationship:

$$EXT\_EXD=(1-FK)*EXT\_EXD+FK*EXT\_SS\_EXD \qquad (25)$$

where,

FK performs an exponential smoothing function according to the following relationship:

$$FK=1/[1+(TC\_EXD/BG\_TMR)] \qquad (26)$$

At 217 an instantaneous temperature value for the midbed point 36 at stoichiometric air/fuel is determined by first calculating a time constant value, TC_CMS, indicative of a temperature rise of the exhaust gas in the catalytic converter 30 in seconds according to the following relationship:

$$TC\_CMS=FN449(AM) \qquad (27)$$

where,

FN449(AM) is a value obtained from a table, indexed by AM, and is indicative of a time constant, in seconds, of the change in catalyst midbed temperature due to a step change in instantaneous predicted exhaust flange temperature versus air mass (AM).

The instantaneous stoichiometric air/fuel temperature value, EXT_CMS, is then determined at 217 as a function of the steady state midbed temperature value, EXT_SS_CMS, the time constant of the temperature rise of the midbed, TC_CMS, and BG_TMR according to the following relationship:

$$EXT\_CMS=(1-FK)*EXT\_CMS+FK*EXT\_SS\_CMS \qquad (28)$$

where,

FK performs an exponential smoothing function according to the following relationship:

$$FK=1/[1+(TC\_CMS/BG\_TMR)] \qquad (29)$$

At step 218 an instantaneous temperature value for the midbed point, EXT_CMD, is determined as a function of the instantaneous exotherm difference, EXT_EXD, and the instantaneous catalyst midbed temperature at stoichiometric air/fuel, EXT_CMS, according to the following relationship:

$$EXT\_CMD = EXT\_CMS + EXT\_EXD \quad (30)$$

where,

EXT_CMS and EXT_EXD are as previously described.

In an alternative embodiment, the instantaneous catalyst midbed temperature may be determined utilizing a temperature sensor.

The use of the estimated catalyst midbed temperature for enhanced CARB OBD-II regulated diagnostics will now be described. Under OBD-II, automotive manufacturers must illuminate the malfunction indicator light (MIL) when the rate of misfires exceeds a rate that will cause catalyst damage due to excess temperature. A misfire may occur for one of two reasons, i.e., either the fuel did not get into the cylinder or a spark did not ignite the fuel in which case an excess temperature is seen at the catalytic converter. Engine misfires of the second type described above cause an increase in the exotherm of the catalytic converter 30 proportional to the misfire rate and a smaller decrease in the exhaust flange gas temperature roughly proportional to the misfire rate. Thus, the catalyst midbed temperature determined based on the presence of engine misfires acts as a gate for the OBD-II misfire MIL threshold by explicitly comparing the estimated catalyst midbed temperature with a catalyst damage temperature, as described below.

Turning now to FIG. 4, if the misfire rate, MISFIRE_RATE, exceeds a value, FNMAXMISPCT(N,AIRCHG), as shown at 400, and the instantaneous catalyst midbed temperature, EXT_CMD, exceeds a calibratable damage threshold, EXT_CAT_DAMAGE, as shown at 401, then and only then is a malfunction signal generated, as shown at 402.

FNMAXMISPCT(N,AIRCHG) is a table of empirically derived values indexed by engine speed, N, and air-charge, AIRCHG, which is indicative of the maximum misfire percentage allowed for a given N and AIRCHG at a stabilized temperature. The catalyst midbed temperature, EXT_CMD, includes the effects of misfires. The variable, EXT_CAT_DAMAGE, is a calibratable value, e.g., 1800 degrees fahrenheit, which is indicative of the temperature at which a catalyst may become degraded. Since the FNMAXMISPCT table would generally cover behavior for stabilized temperatures, the role of the catalyst temperature estimate is primarily to exclude MIL illumination during the warmup phase when the catalyst is not being damaged. The generated malfunction signal can then be used to illuminate the MIL.

The present invention provides a model for determining an accurate estimate of the catalyst midbed temperature by considering the effects of engine misfires. Consequently, fewer illuminations of MILs will occur where there are misfires but the catalyst is not yet up to temperature.

While the best modes for carrying out the invention have been described in detail, those familiar with the art to which this invention relates will recognize various alternative designs and embodiments for practicing the invention as defined by the following claims.

What is claimed is:

1. A method for estimating the midbed temperature of a catalytic converter in an exhaust system of an internal combustion engine having at least one cylinder, the exhaust system including an exhaust pipe for transporting exhaust gas from the engine to the catalytic converter, the method comprising:

sensing a rate of change of the speed of the engine and generating a corresponding speed signal;

estimating a rate of misfires occurring in the engine over a predetermined number of cylinder filling events based on the speed signal;

determining an instantaneous temperature of exhaust gas at a first point on the exhaust pipe based on the estimated rate of misfires;

determining an instantaneous temperature at a midbed point of the catalytic converter based on the instantaneous temperature of exhaust gas at the first point on the exhaust pipe;

comparing the instantaneous temperature at the midbed point to a first temperature threshold indicative of the temperature at which the catalytic converter is damaged;

comparing the estimated rate of misfires to a misfire rate threshold indicative of the maximum misfires allowed for a given engine speed; and generating a failure signal if the instantaneous temperature at the midbed point exceeds the first temperature threshold and the estimated rate of misfires exceeds the misfire rate threshold.

2. The method as recited in claim 1 further comprising illuminating a display upon receiving the failure signal.

3. The method as recited in claim 1 wherein estimating the rate of misfires comprises the steps of:

determining a first value indicative of the incremental number of misfires since a last update based on the speed signal;

determining a second value indicative of the incremental number of cylinder filling events since a last update; and determining a filter constant which is progressively weighted by the total number of cylinder events.

4. The method as recited in claim 3 wherein estimating the rate of misfires is estimated according to the following equation:

$$[FK*B*(A/B-\text{MISFIRE\_RATE(old)}] + \text{MISFIRE\_RATE(old)},$$

where A corresponds to the first value, B corresponds to the second value, MISFIRE_RATE(old) is a value indicative of the average misfire rate estimated during a last update, and FK is the filter constant equal to the reciprocal of the number of cylinder filling events since engine start.

5. The method as recited in claim 1 wherein determining the instantaneous temperature of exhaust gas at the first point comprises:

determining a steady state temperature of exhaust gas at the first point when the engine is firing as a function of a base steady state temperature at the first point at a particular engine speed and aircharge, air/fuel modulation, engine spark timing, exhaust gas recirculation, and engine coolant temperature; and determining a steady state temperature of exhaust gas at the first point when the engine is not firing as a function of a temperature of airflow into the engine and engine coolant temperature.

6. The method as recited in claim 1 wherein determining the instantaneous temperature at the midbed point of the catalytic converter comprises:

determining an instantaneous temperature of exhaust gas at an exhaust gas inlet of the catalytic converter based on the instantaneous temperature at the first point;

determining an instantaneous temperature of exhaust gas at the catalytic converter due to an exothermic reaction of the exhaust gas based on the estimated rate of misfires; and determining a stoichiometric instantaneous temperature at the midbed point at a stoichiometric air/fuel ratio.

7. The method as recited in claim 6 wherein determining the instantaneous temperature of exhaust gas at the catalytic converter due to an exothermic reaction of the exhaust gas comprises:

comparing the instantaneous temperature at the midbed point to a second and third temperature threshold;

if the instantaneous temperature at the midbed point is less than the second temperature threshold, setting the instantaneous temperature of exhaust gas at the catalytic converter equal to zero; and if the instantaneous temperature at the midbed point exceeds the third temperature threshold, determining the instantaneous temperature of exhaust gas at the catalytic converter as a function of a steady state increase in the temperature of exhaust gas in the catalytic converter, the estimated rate of misfires, an increase in the exothermic reaction of the exhaust gas per estimated rate of misfires, and an exothermic reaction at an equivalence ratio of one corresponding to stoichiometric air/fuel ratio.

8. The method as recited in claim 7 wherein determining the stoichiometric instantaneous temperature at the midbed point in the catalytic converter at stoichiometric air/fuel ratio comprises the steps of:

comparing the instantaneous temperature at the midbed point to the second and third temperature threshold;

if the instantaneous temperature at the midbed point is less than the second temperature threshold, setting the stoichiometric instantaneous temperature at the midbed point in the catalytic converter equal to the instantaneous temperature of exhaust gas at the exhaust gas inlet of the catalytic converter; and if the instantaneous temperature at the midbed point exceeds the third temperature threshold, determining the stoichiometric instantaneous temperature at the midbed point in the catalytic converter as a function of the exothermic reaction at an equivalence ratio of one corresponding to stoichiometric air/fuel ratio and the instantaneous temperature of exhaust gas at the exhaust gas inlet.

9. A method for estimating the midbed temperature of a catalytic converter in an exhaust system of an internal combustion engine having at least one cylinder, the exhaust system including an exhaust pipe for transporting exhaust gas from the engine to the catalytic converter, the method comprising:

sensing a rate of change of the speed of the engine and generating a corresponding speed signal;

estimating a rate of misfires occurring in the engine over a predetermined number of cylinder filling events based on the speed signal;

determining an instantaneous temperature of exhaust gas at a first point on the exhaust pipe based on the estimated rate of misfires; and determining an instantaneous temperature at a midbed point of the catalytic converter based on the instantaneous temperature of exhaust gas at the first point on the exhaust pipe.

10. The method as recited in claim 9 wherein estimating the rate of misfires comprises:

determining a first value indicative of the incremental number of misfires since a last update based on the speed signal;

determining a second value indicative of the incremental number of cylinder filling events since a last update; and determining a filter constant which is progressively weighted by the total number of cylinder events.

11. The method as recited in claim 10 wherein estimating the rate of misfires is determined according to the following equation:

$$[FK*B*(A/B-\text{MISFIRE\_RATE(old)}]+\text{MISFIRE\_RATE(old)},$$

where A corresponds to the first value, B corresponds to the second value, MISFIRE_RATE(old) is a value indicative of the average misfire rate estimated during a last update, and FK is the filter constant equal to the reciprocal of the number of cylinder filling events since engine start.

12. The method as recited in claim 9 wherein determining the instantaneous temperature of exhaust gas at the first point comprises:

determining a steady state temperature of exhaust gas at the first point when the engine is firing as a function of a steady state temperature at the first point at a particular engine speed and aircharge, air/fuel modulation, engine spark timing, exhaust gas recirculation, and engine coolant temperature; and determining a steady state temperature of exhaust gas at the first point when the engine is not firing as a function of a temperature of airflow into the engine and engine coolant temperature.

13. The method as recited in claim 9 wherein determining the instantaneous temperature at the midbed point comprises:

determining an instantaneous temperature of exhaust gas at an exhaust gas inlet of the catalytic converter based on the instantaneous temperature at the first point;

determining an instantaneous temperature of exhaust gas at the catalytic converter due to an exothermic reaction of the exhaust gas based on the estimated rate of misfires; and determining a stoichiometric instantaneous temperature at the midbed point at a stoichiometric air/fuel ratio.

14. The method as recited in claim 13 wherein determining the instantaneous temperature of exhaust gas at the catalytic converter due to an exothermic reaction of the exhaust gas comprises:

comparing the instantaneous temperature at the midbed point to a second and third temperature threshold;

if the instantaneous temperature at the midbed point is less than the second temperature threshold, setting the instantaneous temperature of exhaust gas at the catalytic converter equal to zero; and if the instantaneous temperature at the midbed point exceeds the third temperature threshold, determining the instantaneous temperature of exhaust gas at the catalytic converter as a function of a steady state increase in the temperature of exhaust gas in the catalytic converter, the estimated rate of misfires, an increase in the exothermic reaction of the exhaust gas per estimated rate of misfires, and an exothermic reaction at an equivalence ratio of one corresponding to stoichiometric air/fuel ratio.

15. The method as recited in claim 14 wherein determining the stoichiometric instantaneous temperature at the midbed point in the catalytic converter at stoichiometric air/fuel ratio comprises:

comparing the instantaneous temperature at the midbed point to the second and third temperature threshold;

if the instantaneous temperature at the midbed point is less than the second temperature threshold, setting the stoichiometric instantaneous temperature at the midbed point equal to the instantaneous temperature of exhaust gas at the exhaust gas inlet of the catalytic converter; and if the instantaneous temperature at the midbed point exceeds the third temperature threshold, determining the stoichiometric instantaneous temperature at the midbed point as a function of an exothermic reaction at an equivalence ratio of one corresponding to stoichiometric air/fuel ratio and the instantaneous temperature of exhaust gas at the exhaust gas inlet.

16. A system for estimating the midbed temperature of a catalytic converter in an exhaust system of an internal combustion engine, the exhaust system including an exhaust pipe for transporting exhaust gas from the engine to the catalytic converter, the system comprising:

a sensor for sensing a rate of change of the speed of the engine and generating a corresponding speed signal; and a controller for performing the following:
estimating a rate of misfires occurring in the engine over a predetermined number of cylinder filling events based on the speed signal;
determining an instantaneous temperature of exhaust gas at a first point on the exhaust pipe based on the estimated rate of misfires; and
determining an instantaneous temperature at a midbed point of the catalytic converter based on the instantaneous temperature of exhaust gas at the first point on the exhaust pipe.

17. The system as recited in claim 16 wherein the controller further performs:

determining a steady state temperature of exhaust gas at the first point when the engine is firing as a function of a base steady state temperature at the first point at a particular engine speed and aircharge, air/fuel modulation, engine spark timing, exhaust gas recirculation, and engine coolant temperature; and determining a steady state temperature of exhaust gas at the first point when the engine is not firing as a function of a temperature of airflow into the engine and engine coolant temperature.

18. The system as recited in claim 16 wherein the controller further performs:

comparing the instantaneous temperature at the midbed point to a first temperature threshold indicative of the temperature at which the catalytic converter is damaged;

comparing the estimated rate of misfires to a misfire rate threshold indicative of the maximum misfires allowed for a given engine speed; and generating a failure signal if the instantaneous temperature at the midbed point exceeds the first temperature threshold and the estimated rate of misfires exceeds the misfire rate threshold.

19. The system as recited in claim 18 further comprising a display for displaying the failure signal.

20. A method for monitoring degradation of a catalytic converter in fluid communication with an internal combustion engine, comprising:

detecting engine misfires;

estimating catalyst temperature based in part on said detected misfires; and providing an indication of catalyst degradation when both a number of said detected misfires and said estimated temperature exceed respective preselected values during a predetermined test interval.

21. The method recited in claim 20 wherein said misfire detection is based on a number of misfires occurring during said test interval.

22. The method recited in claim 21 wherein said catalyst temperature estimate is in part derived from an approximation of temperature increase caused by an exothermic reaction of the exhaust gas due to said misfires.

23. The method recited in claim 20 wherein said estimated temperature is estimated by first estimating temperature at an inlet of the catalyst based on engine operating parameters and then approximating temperature gradient from said inlet to a midpoint of the catalyst.

24. The method recited in claim 23 wherein said operating parameters comprise engine speed, ignition timing, inducted airflow, and engine coolant temperature.

25. The method recited in claim 20 wherein said misfire detection further comprises a step of detecting engine crankshaft acceleration.

* * * * *